United States Patent [19]

Stratton et al.

[11] 4,105,897

[45] Aug. 8, 1978

[54] CYCLOCONVERTER APPARATUS AND METHOD FOR WORKING INTO AN ACTIVE LOAD

[75] Inventors: Lawrence J. Stratton, Lexington; Dennis C. Jeffreys, Bedford; Albert W. Welz, Jr., Westford; Reed H. Johnston, Wellesley, all of Mass.

[73] Assignee: New England Power Service Company, Westborough, Mass.

[21] Appl. No.: 676,468

[22] Filed: Apr. 13, 1976

[51] Int. Cl.$^2$ .............................................. H02J 3/02
[52] U.S. Cl. .................................. 307/3; 340/310 A; 363/159
[58] Field of Search .................. 321/7, 9 R, 69 R; 307/1, 3, 6, 36, 75, 140; 340/310 A; 363/159–161

[56] References Cited

U.S. PATENT DOCUMENTS

| | | | |
|---|---|---|---|
| 2,305,862 | 12/1945 | Gilliver et al. | 307/140 |
| 2,860,324 | 11/1958 | Berger et al. | 340/310 R |
| 3,211,914 | 10/1965 | Anderson | 307/3 |
| 3,488,517 | 1/1970 | Cowan et al. | 307/3 |
| 3,718,854 | 2/1973 | Spyrou | 321/69 R |
| 3,991,354 | 11/1976 | Rosa et al. | 321/7 |

*Primary Examiner*—William M. Shoop
*Attorney, Agent, or Firm*—Richard J. Birch

[57] ABSTRACT

A cycloconverter apparatus and method is disclosed in which the cycloconverter works into an active load. The cycloconverter is connected between an external power source and a load so that the load current flows through the cycloconverter. In the preferred embodiment, the cycloconverter is used to impress a signaling voltage waveform upon the voltages of the three phases of an electric power distribution feeder. This voltage is impressed by injecting it between the common point of the wye-connected secondary of the substation transformer and the grounded neutral that serves all phases of the distribution feeder. The neutral current of the distribution feeder flows through the cycloconverter. Protective by-pass circuitry is provided to maintain the integrity of the neutral path in the event of a phase-to-neutral short circuit or a failure of the cycloconverter.

27 Claims, 9 Drawing Figures

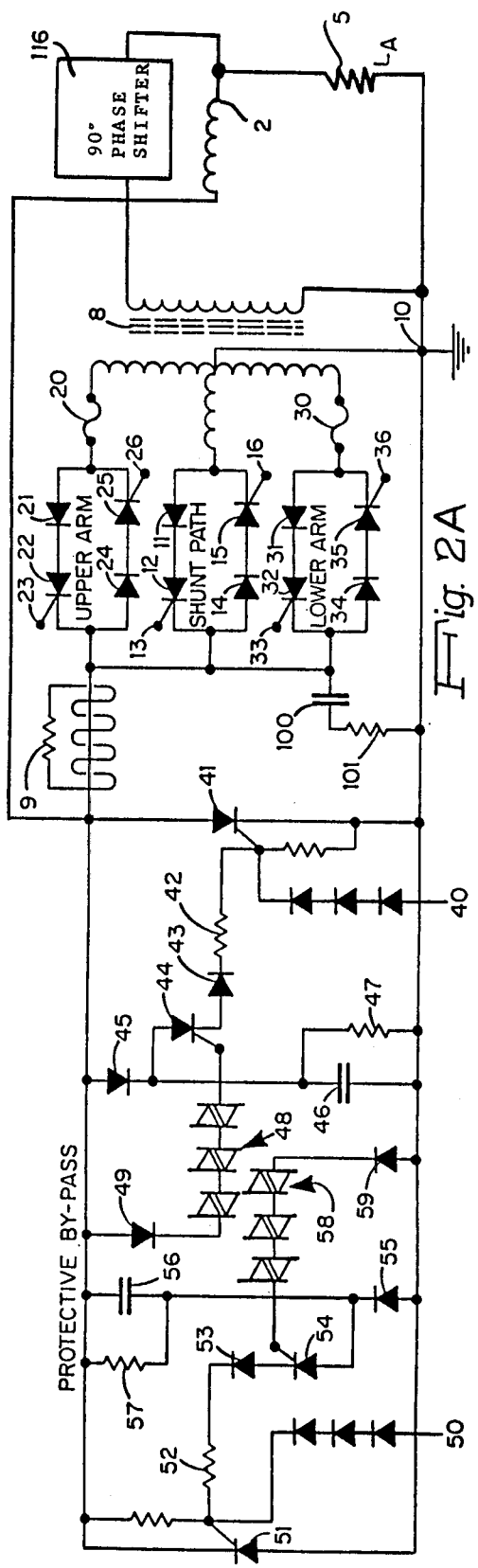

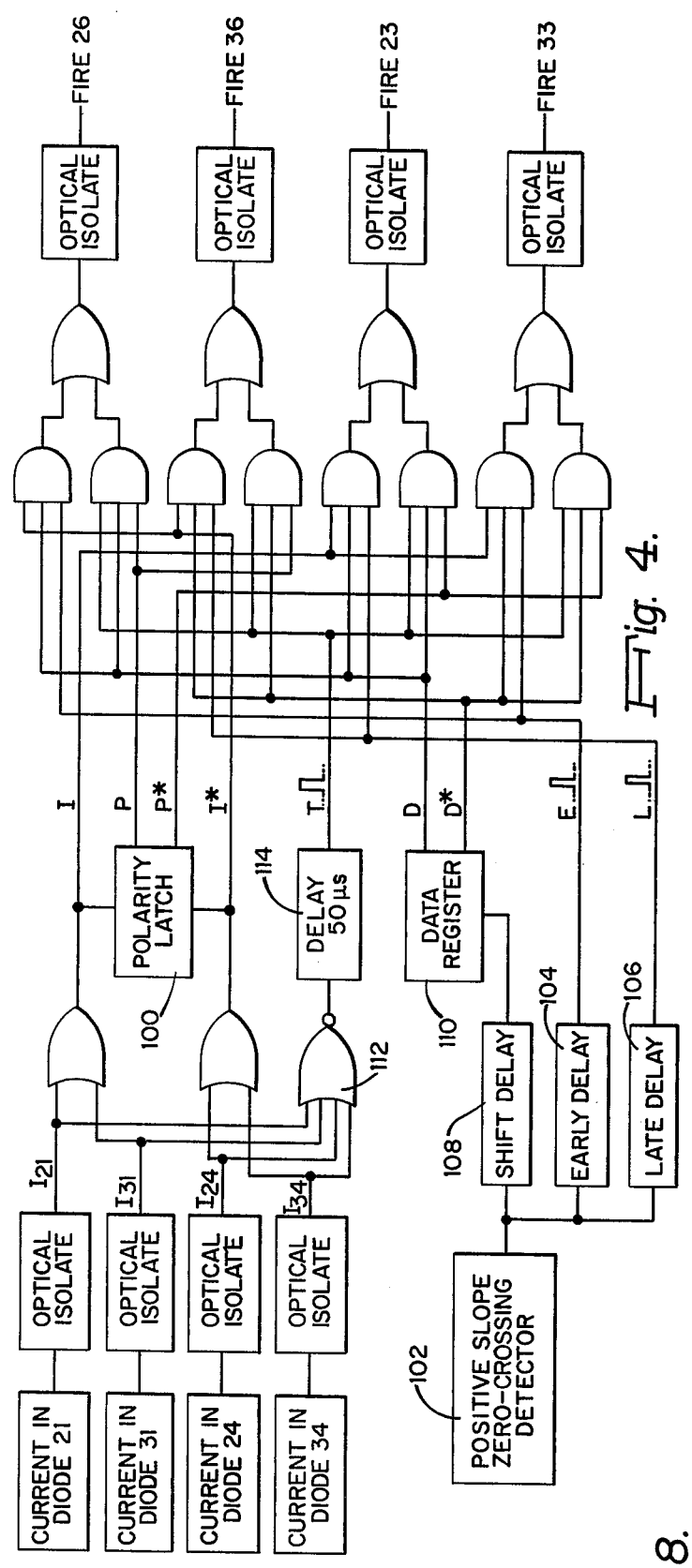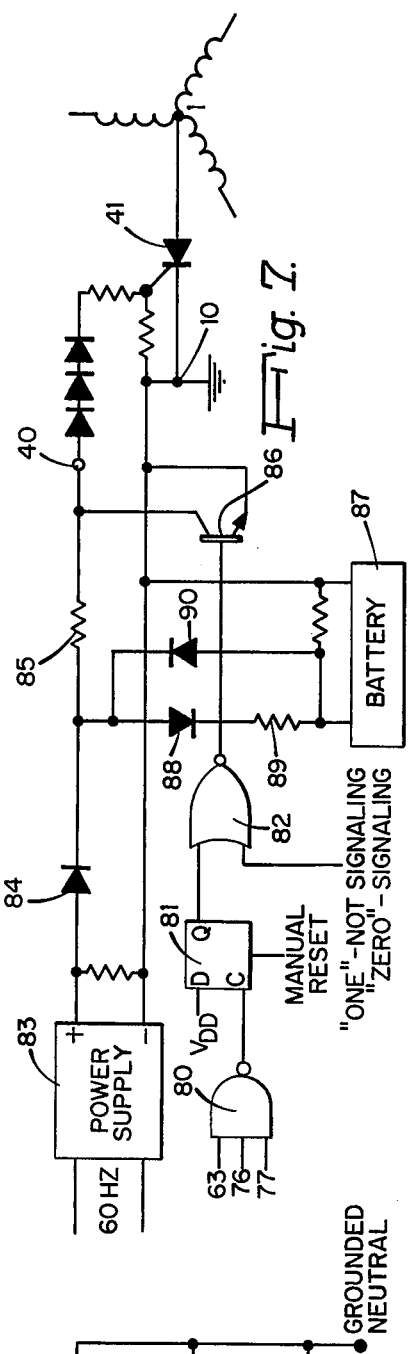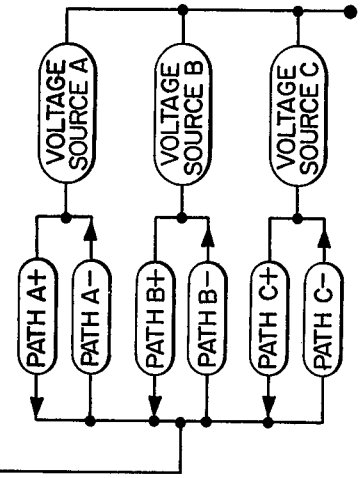

CYCLOCONVERTER APPARATUS AND METHOD FOR WORKING INTO AN ACTIVE LOAD

BACKGROUND OF THE INVENTION

The present invention relates to cycloconverters in general, and more particularly, to a cycloconverter that is designed to work into an active load.

The initial work on cycloconverters was done in Germany during the 1930's using mercury arc tubes to convert 50 Hz power to 16 2/3 Hz power for traction motors on electric railroads. While considerable developmental work has been carried out, the practical application of cycloconverters has, until very recently, been restricted by excessive cost of equipment.

The principal application, or proposed application, of cycloconverters has been in the role of frequency conversion for power systems. The essential element of a cycloconverter is the pairing of phase-controlled rectifiers in inverse-parallel with modulation of the triggering to achieve an alternating output; the frequency of the output is usually lower than the source frequency. In general, the classical employment of cycloconverters has been in converter roles which can be catagorized according as the input or the output frequency is variable or constant. The four possible combinations with examples of their application are enumerated below.

1. Constant frequency input and output: One of the earliest applications was that of the German work on traction motors mentioned above.
2. Variable frequency input, constant frequency output: Generating systems for aircraft represent an important application of this class.
3. Constant frequency input, variable frequency output: Such systems find application in various types of variable speed motor drives.
4. Variable frequency input, adjustable frequency output: This would be applicable to vehicle propulsion from an on-board prime mover; it would permit the prime mover to be operated in its efficient speed range and allow the vehicle to travel at any desired speed.

An essential feature of all these earlier applications is that they all operate into passive loads; the cycloconverter provides the power that serves the load from the voltage sources that supply the cycloconverter.

Cycloconverters may be classified according as they are commutated naturally by the a.c. supply voltage or are forcecommutated by external sources. The present invention relates to cycloconverters of the naturally commutated type.

In the preferred embodiment of the present invention the voltage waveform that is synthesized in the cycloconverter provides an insignificant fraction of the total power to the load; a source external to the cycloconverter provides the power to the load. The supply voltages for the cycloconverter can be derived from the external source that supplies power to the load or from another source. The load current flows through the cycloconverter, but, since this is driven by forces external to the cycloconverter this current tends not to be correlated to the voltage waveform synthesized in the cycloconverter. It is principally in this respect that the present invention stands in marked contrast to all prior art relating to cycloconverter technology.

The extent of this departure from conventional practice may readily be appreciated on considering the application for which this invention was made. In this first application a cycloconverter is used to synthesize a single-phase voltage waveform which is superimposed upon the voltages of the three phases of an electric power distribution feeder. This superimposed voltage is impressed by injecting it between the common point of the wye-connected secondary of the substation transformer and the grounded neutral that serves all phases of the distribution feeder. The superimposed voltage is used merely to add to the normal supply voltage a signal to represent digital information at the points served by the distribution feeder.

The current that flows through the cycloconverter is in this case the neutral current of the distribution feeder. This is determined by the unbalance of the loads among the three phases and accordingly its phase is totally unpredictable. In fact, this neutral current contains significant contributions of third harmonic and accordingly it may depart significantly from a simple 60 Hz wave of unknown phase.

The voltage waveform added to the three phase voltages must be in a well-defined phase relationship to the voltages that supply the power to the feeder. This requires that the input voltage wave to the cycloconverter be derived from the voltages that supply the feeder and that unknown phase shifts in the cycloconverter, per se, be avoided. It is this latter consideration for avoiding unknown phase shifts within the cycloconverter that requires the use of an envelope type of cycloconverter for the particular application for which this new technology was devised.

One should observe, however, that this new technology could be applied to cycloconverters in which unknown phase shifts occur. The consideration of importance is the amount of phase shift that could be tolerated; if instead of injecting a single phase voltage in the neutral one had elected to impress individual signaling voltages on each phase then some uncertainty in phase shift in the superimposed signal could have been tolerated.

Another very important consideration with respect to the new technology is related to the fail-safe provisions that must be incorporated in the design of the cycloconverter. In the application mentioned above the cycloconverter appears as a conductive element in the neutral of the electric distribution feeder. All the neutral current must pass through the cycloconverter or through protective bypass circuitry. In the event of a fault on the distribution feeder currents of magnitudes approaching 10,000 amperes may be encountered in the neutral and it is imperative that current continuity be maintained so that excessive voltages will not arise between phase and neutral on the distribution feeder. Failure to provide for this fail-safe action could result in excessive voltages being delivered to the customers under certain types of fault condition with the consequence that equipment on the customers's premises could be destroyed.

When the cycloconverter provides the power to the load as in the case of prior applications, the current waveform is determined by the waveform synthesized in the cycloconverter and the impedance of the load. In this invention the current waveform is not determined by the waveform produced by the cycloconverter and the current zero-crossings are not correlated with the zero-crossings of the supply voltage of the cycloconverter. This necessitates a firing technology that differs markedly from that of established practice. The new firing technology and the protective or fail-safe circuitry are additional elements of novelty in this invention.

WAVE SYNTHESIS IN CYCLOCONVERTERS

Before proceeding to a detailed consideration of the preferred embodiment it may be helpful to review briefly some properties of the wave synthesis process in cycloconverters.

The primative wave is created from successive segments selected from the input voltages. Often there is a plurality of input voltages consisting of sinusoidal waveforms of different phase but of equal amplitude; this is the condition that customarily applies when a cycloconverter is used as a frequency converter for power systems. When the primative wave is synthesized from segments of sinusoidal waves of equal amplitude then usually this primative wave exhibits a saw-toothed structure; it may be necessary to rely upon the use of inductors to smooth out the discontinuities to realize a waveform that satisfactorily approximates the desired wave.

If inductors are used to smooth out the sharp discontinuities in the primative wave it is inevitable that a voltage phase shift will result from the flow of current through the inductor. This is of no consequence if the cycloconverter is to be used as the principal or sole power supply to the load; but if the voltage synthesized in the cycloconverter must preserve a specific phase relationship to the principal voltage supplying power to the load one cannot tolerate unkown phase shifts. This uncertainty in phase shift becomes all the greater in this case where the current that flows through the cycloconverter is determined by conditions totally external to the cycloconverter. In this initial application where the cycloconverter is to impress a desired waveform in the neutral of the three-phase distribution feeder it is unacceptable to encounter significant phase shifts of undetermined and variable magnitude.

Thus for this first application of the new technology it was desirable that inductors for smoothing out sharp discontinuities be avoided. In the special case where the frequency of the supply voltage is greater than the frequency of the waveform to be generated it is sometimes possible to create an acceptable waveform in an envelope type of cycloconverter without the use of any smoothing inductors. FIG. 1 depicts the fashion in which a 30 Hz sinusoidal wave may be approximated from sinusoidal segments of 60 Hz waves; in FIG. 1 it will be noted that the two polarities of only two phases of 60 Hz are used and the amplitudes of the input voltages are not equal. The closeness with which the waveform approximates the desired waveform is obviously determined by the number of phases that are used to provide sinusoidal segments. In a cycloconverter of this type there will be no phase shifts of variable and unknown magnitudes.

Customarily the cycloconverter is used to synthesize a waveform that approximates to a sinusoid. There is no inherent requirement that the waveform synthesized in a cycloconverter be sinusoidal and in this initial application where the synthesized waveform is used merely to superimpose digital intelligence upon the pre-existing phase voltages one may employ any waveform that can satisfactorily be detected and which does not interfere with the originally intended use of the phase voltages.

The equipment is minimized through the use of a single source voltage for the cycloconverter. All the features that will be described for the case of a single source voltage can be extended to cases in which cycloconverters are served with a plurality of source voltages—those skilled in the art will readily recognize that the extension merely requires replication of the control circuitry to provide for controlled current flow through a larger number of paths.

In discussing the new technology which is the subject of the present invention attention will be focussed on the synthesis of waveforms that can be derived from a single source of voltage to the cycloconverter, recognizing that the teaching thereby imparted can easily be extended to cases of multiple voltage sources supplied to the cycloconverter.

OBJECTS OF THE PRESENT INVENTION

It is a general object of the invention to provide a cycloconverter which works into an active load. There arises in the case of an active load a requirement that proper switching be achieved for all conceivable phase relationships between the current and the synthesized voltage wave.

Accordingly it is another object of the present invention to provide a method and apparatus for accomplishing the desired transitions between successive segments of the synthesized voltage waveform irrespective of the sense in which the current may be flowing when this transition is effected.

It is a further object to provide a method and means for ensuring the continuity of current flow when the sense of such flow reverses at any time within a segment of the synthesized voltage waveform or at the transition between successive segments of the synthesized waveform.

Another object of the present invention is to provide a method and a means for sensing the current flow in the various current paths of the cycloconverter and for sensing the cessation of such currents to the extent that this is required to effect the proper switching of current paths while synthesizing the desired voltage waveform.

It is still a further object to provide a method and means for sensing the total current flow through the cycloconverter so that, in the event of a short circuit developing in the load, the cycloconverter can be bypassed by means that will permit proper corrective action to be taken irrespective of the presence of the cycloconverter.

An associated object of the invention is the provision of the method and means by which protective action for dealing with a short circuit in the load may be instituted in the case where current continuity must be maintained at a level that could not be sustained through the cycloconverter per se.

Another object of the present invention is to provide a method and means for switching among the successive segments of the synthesized waveform so as to ensure that in normal switching operations none of the sources of voltages to the cycloconverter are short circuited and further, to ensure that in the event of a short circuit in the load or an adverse transient occurring near the time of switching, any excessive loading that might be imposed upon a voltage source will not persist beyond the terminal portion of the half-sinusoid in which it occurs.

It is another particular object of the present invention that a desirable waveform be synthesized from voltages appearing on the electric power lines and that the cycloconverter provide a means whereby the synthesized voltage may be superimposed upon the voltages that pre-exist on the power lines.

Another particular object of the present invention is to provide a waveform of output voltage that is phasally related to the voltages that appear on the power line in accordance with an intended relationship.

It is still another particular object of the present invention to provide a method and means whereby the same singlephase voltage waveform which is synthesized in the cycloconverter can be superimposed on the voltages appearing on all the phases of the power line by impressing the synthesized waveform between the grounded neutral of the distribution system and the common point of the wye-connected secondary of the substation transformer.

These objects and features and other objects and features will best be understood from a detailed discussion of a preferred embodiment of the invention, selected for purpose of illustration and shown in the accompanying drawings in which:

FIG. 1, which was previously referenced, depicts a waveform from an envelope-type of cycloconverter which produces an output wave that has a frequency half that of the input voltages (this will not be referred to further in the discusion of the preferred embodiment);

FIG. 2A depicts in schematic and block diagram form the envelope-type cycloconverter of FIG. 2 as used in a single phase electric distribution system.

FIG. 4 depicts in block diagram the switching logic for firing SCR's in the implementation of the first application of the invention;

FIG. 7 is a partial schematic and block diagram of the circuitry for triggering the bypass SCR's either in response to logic levels generated in FIGS. 5 and 6 or in response to intended usage; and, FIG. 8 is a flow path diagram of a plurality of current paths and the sense of current through each in a cycloconverter.

DETAILED DESCRIPTION OF A PREFERRED EMBODIMENT

Conventions as to Sense and Magnitudes of Currents and Voltages

Figure 2:
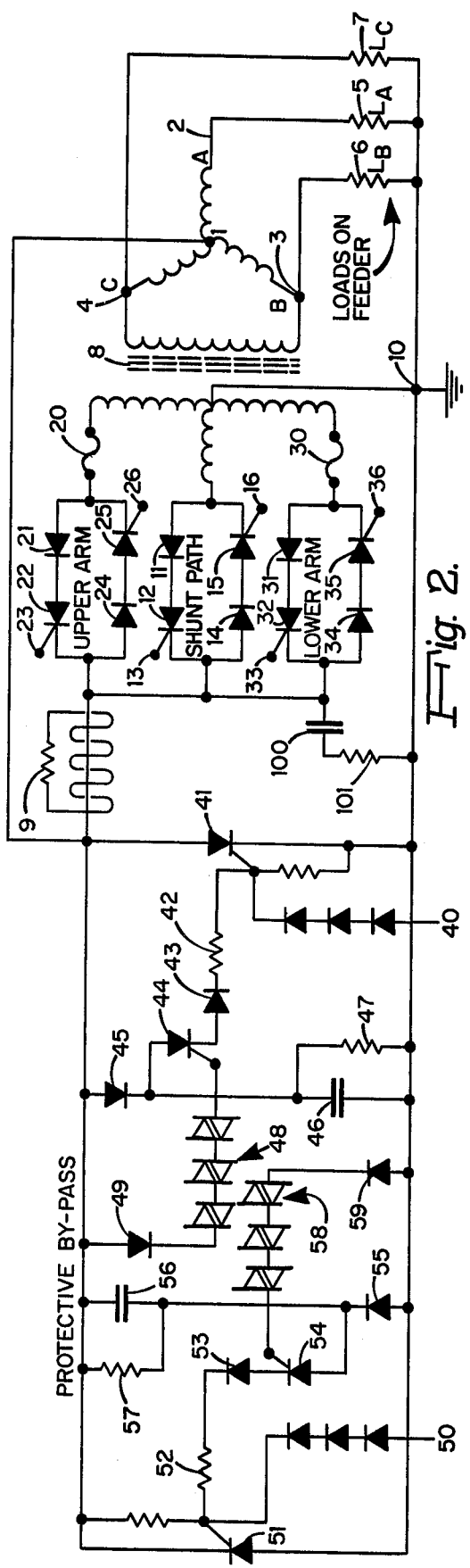
FIG. 2 depicts in schematic form an envelope-type cycloconverter used to impress a desired waveform on the voltages of the three phase of an electric distribution system, with protective circuitry for guaranteeing the integrity of the neutral in the event of a phase to neutral fault on the feeder or a failure of any part of the cycloconverter.

Discussion of the detailed operation of the preferred embodiment selected for purpose of illustration will be facilitated by adopting certain conventions with respect to positive and negative senses in FIG. 2. To this end it should be understood that current flow that enters the common point 1 of the wye-connected secondary of the substation transformer from the grounded neutral 10 is regarded as the positive sense of current flow. The substation transformer supplies power to phases A, B and C, identified as 2, 3 and 4, respectively in FIG. 2. The corresponding phase loads $L_A$, $L_B$ and $L_C$ are numbered 5, 6 and 7, respectively.

One may conveniently regard the grounded neutral 10 which appears at the center-tap of the secondary of the modulation transformer as being at zero potential. The sense of polarity of potential is defined by adopting the convention that if a pair of parallel current paths are carrying current in the positive sense through the cycloconverter the current will commutate to that path which is supplied by the more positive potential from the modulation transformer.

With a convention established with respect to both the absolute value and sense of potentials one may define a voltage curve of positive slope as one in which in potential is increasing algebraically with increasing time; thus a voltage source of positive slope is equally a voltage of positive polarity that is increasing in absolute value with increasing time or a source of negative potential that is decreasing in absolute value with increasing time.

The Cycloconverter

The cycloconverter derives its input voltage from a modulation transformer 8 the primary of which is excited by voltage corresponding to the voltage that exists between phases B and C, designated respectively 3 and 4 in FIG. 2. In the actual implementation of this modulator it is preferably that this input voltage be derived from the source that supplies the substation transformer, since this source is less distorted in the event of a fault on the feeder. However, for simplicity of illustration, the voltage is shown in FIG. 2 as being derived from the secondary of the substation transformer.

When the modulation transformer 8 is regarded as a part of the cycloconverter there is only a single voltage input. There are, however, three current paths; one of these is the shunt path which ignores the contribution of the input voltage; the other two labelled respectively the upper arm and the lower arm derive their voltage from the upper half or the lower half of the center-tapped modulation transformer as depicted in FIG. 2.

Designation of Components

In order to facilitate the description of the operation of the cycloconverter and its associated circuitry, the numbering of components has followed a logical procedure in that the shunt path, the upper arm and the lower arm are comprised of similar elements. The decade 10 through 19 is allocated to the shunt path, decade 20 through 29 is allocated to the upper arm and the decade 30 through 39 is allocated to the lower arm. With this allocation the units digit in each of these arms is assigned the same functional role. Thus for all paths units digit 3 pertains to the gate of the silicon controlled rectifier (SCR) which is capable of carrying current in the positive sense.

Similarly in the case of the bypass circuitry appearing at the left of FIG. 2, the decade 40 through 49 is reserved for components associated with the flow of negative current and the decade 50 through 59 is reserved for components associated with the flow of positive current. In these cases the units digits will be used to designate corresponding components.

Operation When the Cycloconverter Is Intentionally Bypassed

The discussion of the operation of the circuitry depicted in FIG. 2 may easily begin with the situation that prevails at a time when no signaling on the feeder is attempted — i.e. when the cycloconverter is inoperative. At this stage the SCR's designated 41 and 51 are both continuously triggered from battery-powered sources designated 40 and 50 which will be described in greater detail in connection with FIG. 7. The use of a battery-powered supply insures that these gates will be triggered even if the feeder has been dead for some time. These battery-powered sources are isolated from the feeder by their power supplies and are maintained in a state of full charge automatically whenever the line is energized.

When signaling is to begin — i.e. the cycloconverter is to be used — the logic of the signaling facility (to be discussed later) applies signals to gates 13 and 16 of the shunt path; signals 40 and 50 are then discontinued. This merely sets the cycloconverter in readiness. This might appear an unnecessary precaution in that SCR's 41 and 51 provide a path similar to that provided in the shunt path. However, this is important since the SCR's 12 and 15 are of inverter grade and SCR's 41 and 51 are not.

Inverter grade SCR's are characterized by their property that in the absence of triggering of the gate the carries disappear rapidly subsequent to the cessation of conduction. One pays a premium for this rapid disappearance of charge and in general SCR's of very large current carrying capability tend not to be available in inverter grade. The SCR's 41 and 51 must be capable of sustaining the fault current until this is interrupted by the substation breaker and accordingly are appreciably larger in current carrying capability than are SCR's 12 and 15.

PROTECTIVE CIRCUITRY

Before discussing in detail the operation of the cycloconverter, consideration will be given to the protective mechanism that comes into operation in the event that a fault were to develop on the feeder or the cycloconverter were to fail. This is appropriate at this point in the description because elements of the protective circuitry are used in the operation of the cycloconverter, per se.

In the conventional use of cycloconverters any failure of the cycloconverter will result in the cessation of current into the load. By contrast, in the case of the present invention the current through the cycloconverter is impressed by sources external to the cycloconverter. In the electrical power line embodiment continuity of current flow is an essential condition that must be satisfied irrespective of what fate may befall the cycloconverter. The particular instance in which the cycloconverter serves to impress a desired voltage waveform between the grounded neutral of the distrubtion feeder and the common point of the secondary of the wye-connected substation transformer is illustrative of a situation in which it is essential that current flow be maintained irrespective of whether or not the cycloconverter continues to operate correctly.

If, in the event of a fault between phase and neutral, the neutral current were to rise excessively it is posssible that the cycloconverter would cease to function properly. The normal phase current of a typical substation transformer is rated at about 400 amperes, but the transformer is designed to withstand the magnetic forces associated with currents which are about 25 times this rating. Thus occasions may arise in which a fault could cause the neutral current to increase to 10,000 amperes. It is unrealistic from economic considerations to expect the cycloconverter to be designed to sustain currents of this magnitude and to continue in its normal pattern.

One must not permit the voltage between the grounded neutral and the common point of the substation transformer to rise excessively. As a practical matter, this voltage should not exceed about five percent of the phase-to-neutral voltage of the feeder in order that the normally present over-voltage protection not be falsely triggered. One must therefore provide an automatic protective means by which a neutral fault current path will be established before the voltage between neutral and the common point of the wye-connected transformer attains a level corresponding to five percent of the phase-to-neutral voltage.

Relief from the excessive demands upon the cycloconverter in the event of a fault on the distribution feeder is achieved through bypassing protective circuitry. Two SCR's 41 and 51, which need not be of inverter grade, are used to provide a shunt path in the event of excessive neutral current. The operation of the protective circuitry in both its normal designed use, and also in the back-up mode which becomes operative if circuit logic fails, will now be discussed.

The triggering of by-pass SCR's 41 and 51 may impose a short circuit on the cycloconverter which will persist until the current reverses in the SCR of the cycloconverter that is then conducting. This conduction time cannot exceed about 1/120 seconds in the case of 60 Hz feeders. The current through the SCR of the cycloconverter is limited, during this time of short circuit, by the impedance of the modulation transformer; the single half-cycle rating of the SCR must be adequate to survive this insult. In general the single half-cycle current carrying capability is about ten-fold greater than the continuous-duty rating of the SCR for the situation in which the half-cycle insult is imposed from full load.

Under fault conditions the fault current might rise to 10,000 amperes. The current through the cycloconverter is continuously monitored by means of the current transformer with its associated burden 9. If the current through the cycloconverter exceeds 100 amperes the protective bypass circuitry is actuated to preserve the integrity of the path for the neutral current. This 100 amperes limit is chosen from the combined considerations that this is comfortably in excess of anticipated out-of-balance currents and the 100 amperes lies within the volt-second capability of voltage sources to the cycloconverter to effect the commutation. The logic signal responsible for the triggering of this protective circuitry is generated in circuitry such as that depicted in FIG. 5.

Figure 5:
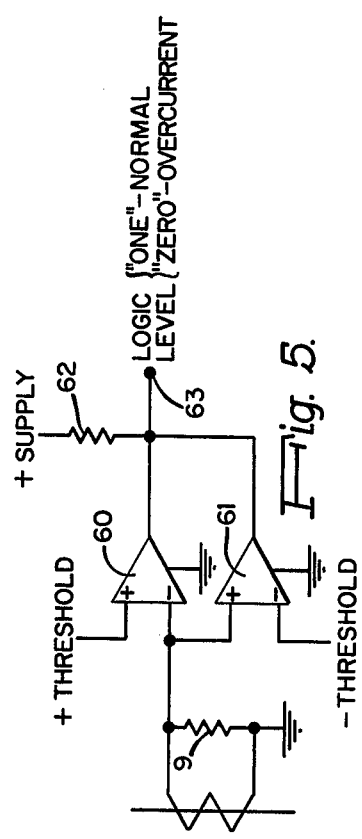
FIG. 5 is a partial schematic and block diagram of the circuitry logic levels to signify that the current through the cycloconverter is excessive.

In FIG. 5 two comparators 60 and 61 are used; one to sense excessive positive current and the other to sense excessive negative current flowing in the current transformer and associated burden 9. The outputs of these two comparators are connected to a common load resistor 62 which is connected to the positive supply voltage.

A "one" level exists at the output of each comparator when the monitored current lies within normal operating limits for the cycloconverter. An overcurrent situation will produce a logic level "zero" at the output of the comparator which senses current of that polarity. By tying the outputs to a commonload resistor, one essentially achieves an AND function 63 which produces logic level "zero" for any overcurrent situation.

The current paths from the modulation transformer are separately fused. An opening of any of these fuses could result in an interruption of the path for the neutral current without causing any excessive current in the cycloconverter. Thus, there is need for additional emergency triggering of a bypass path to ensure that the integrity of the path for neutral current. The logic signals for triggering the bypass mode to accommodate this eventuality can be generated by means of circuitry such as is depicted in FIG. 6.

Figure 6:
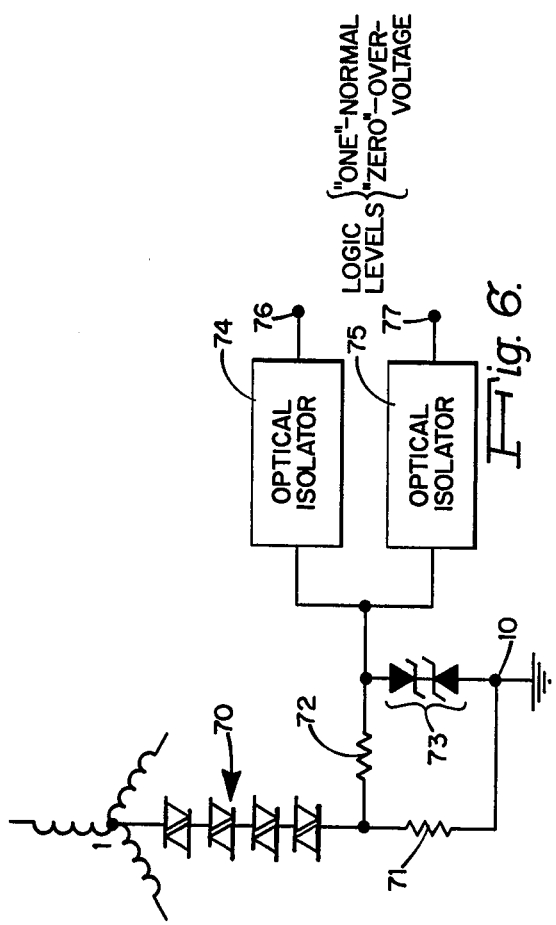
FIG. 6 is another partial schematic and block diagram of the circuitry for generating logic levels to signify that the voltage between the grounded neutral of the distribution system and the common point of the wye-connected secondary of the substation transformer is excessive.

In FIG. 6 a diac chain 70 with a series resistor 71 is connected between the common point of the secondary of the wye-connected substation transformer 1 and the grounded neutral of the distribution feeder 10. When the current path through the cycloconverter is interrupted by the blowing of a fuse the voltage between these two points begins to rise in the event that the cycloconverter attempts to signal; when the voltage difference attains a preset level determined by the diac chain (256 volts in the case of the installation in which this circuitry was first used) the diac chain breaks down. When the diac chain breaks down the entire voltage appears across the series resistor 71 causing current to flow through the diac chain and the current-limiting resistor 72 and through a pair of back-to-back zener diodes 73. These zener diodes establish a level of ± 9 volts — the sign being determined by the sense of the 256 volt potential difference.

Naturally one wishes to generate a triggering signal for the protective bypass circuitry which will be of uniform sense and polarity referenced to ground potential. To accomplish this the ± 9 volt signal is used to activate one or other of a pair of optical isolators 74 and 75. The output 76 or 77 of the optical isolators is a logic level "zero" in response to an overvoltage.

Thus there are three instances in which a logic level "zero" is generated in circumstances in which the bypass circuitry must be triggered to acommodate abnormal operation of the cycloconverter. One of these appears at the common output 63 of comparators 60 and 61 of FIG. 5 and the other two appear as outputs 76 and 77 from the optical isolators 74 and 75 of FIG. 6. These are combined in NAND gate 80 of FIG. 7 which indicates the circuitry by means of which signals 40 and 50 of FIG. 2 may be created.

In FIG. 7 the output of NAND gate 80 supplies the clock of D-type latch 81. Any of the logic levels corresponding to an alarm situation produce a positive output from this NAND gate and the latch 81 is set by the signal to its clock. This latch remains set until reset manually.

When one is not signaling it is desirable to maintain the system in a state of sustained bypass by continuously triggering the bypass SCR's 41 and 51 of FIG. 2. To achieve this possibility, NOR gate 82 is used to combine the emergency signal from latch 81 with a logic level that is "zero" when signaling and "one" when not signaling. This logic level which specifies whether one is signaling or not is generated in response to message traffic by circuitry external to this invention.

Triggering signals 40 and 50 of FIG. 2 can be generated by a technique which will provide for a back-up power supply such as is depicted in FIG. 7. Separate circuits are required for the current two polarities; that for negative current is shown. Here a power supply 83 actuated from line voltage is floated relative to the 60 Hz system by virtue of the isolation provided in the transformer input to the power supply. Transistor 86 with is current limiting resistor 85 controls the gate drive of SCR 41.

A battery supply 87 (which is also floated with respect to the 60 Hz system) is maintained in a state of full charge by means of diodes 84 and 88 and current limiting resistor 89. In the event that the 60 Hz power to the power supply 83 were to fail then the floating battery supply 87 provides a back-up for power supply 83 through diode 90.

In the transition to the bypass path the forward drop of the diode and the SCR in series will tend to be sufficiently greater than the forward drop in the bypass SCR's, which have no series diodes, that the current will preferentially flow through the bypass during the initial half cycle in which conduction persists once the gate drive to the shunt path has been removed.

Once the bypass circuitry has been activated, the trigger to the bypass SCR's will be maintained until the fault has been cleared and will continue to be applied until removed when signaling is next attempted. One must, however, preserve the integrity of the neutral even in the event of failure of the bypass triggering signal. Accordingly, it is important to consider the sequence of events that would occur in the case of a fault when the triggering signal to the bypass SCR's is absent.

Once the current path in the neutral has been interrupted the voltage between the grounded neutral 10 and the common point of the wye-connected secondary of the substation transformer 1 will begin to rise. As this rises the protective circuitry designated by components 40 through 49 or 50 through 59 will become operative because the voltage rise promotes current flow in the positive or negative sense, respectively. In this discussion it will be assumed that the voltage rise promotes current flow in the positive sense as is shown at the extreme left of FIG. 2. (Half a cycle later flow in the opposite sense will be applicable to the other set of components.)

As the potential of the common point of the secondary of the substation transformer falls below the zero potential of the grounded neutral this entire potential drop appears across the diac chain. Similarly, current flows through the diode 55 to charge the capacitor 56 to within less than a volt of this total potential drop. When the voltage across the diac chain attains a level substantially in excess of the voltage encountered in normal modulation by the cycloconverter but less than five percent of the phase-to-neutral voltage of the feeder the diac chain will break down — in a 13 kV feeder this may occur at a level of about 300 volts.

When the diac chain 58 breaks down, current flows through diode 59, through the diac chain 58, through the gate of SCR 54 through diode 53, through resistor 52 which serves temporarily to limit the current, and predominantly through the gate of SCR 51. The flow of current through the gate of SCR 54 serves to trigger this SCR with the consequence that capacitor 56 delivers a large current pulse through SCR 54 and through the gate of SCR 51. It is important that a large triggering current be supplied to the gate of SCR 51 since this must accommodate the steeply rising fault current. Once SCR 51 is conducting the voltage will collapse and current will cease to flow through the diac chain.

The bypass SCR's 51 and 41 need not be of inverter grade but should be capable of handling the full fault current which may reach 10,000 amperes, and should handle this current until the circuit breaker has cleared the fault. Before reclosing into the fault, precautions are taken to insure that the gates of SCR's 51 and 41 are triggered "hard on" by signals 50 and 40.

In applications of this invention two or more SCR's can be used in parallel to carry the load of each of the SCR's 51 and 41. In this case the resistor 52, diode 53 and external triggering source 50 for the positive current and the corresponding components for the negative current are replicated. This insures that the turn-on signal to the gates will be properly divided and also insures that a fault on one path will not destroy the capability of the parallel path.

A resistor 57 appears across capacitor 56 with similar provision in the negative current side of the protective circuitry. This resistor serves to bleed off the charge that accumulates on these capacitors as a result of operating the cycloconverter. Capacitors 56 and 46 serve to provide current continuity in the neutral when the cycloconverter is in service — this occurs during a brief interval subsequent to reversal of current flow, during which time the SCR that is next to conduct remains untriggered. This is discussed in detail below and is mentioned here only to call attention to the fact that the time constant of the RC elements 57, 56, and 47, 46 need not be small compared to the 60 Hz period in order that these capacitors may serve this role.

At the time when these capacitors are providing continuity of neutral current there will be a sharp discontinuity of voltage of magnitude comparable to the peak of the modulation voltage. One may, of course, always choose to provide a separate capacitive path to serve the cycloconverter in the desired fashion if any objectionable features are experienced in using capacitors 46 and 56 in this dual role; such a bypass is shown in FIG. 2 as capacitor 100 and resistor 101. (This resistor serves merely to limit the peak discharge current.)

Notice that the protective circuitry is such that normal reclosure procedures can be adopted even if the external triggering sources 40 and 50 should become inoperative. The fail-safe characteristics of the cycloconverter are such that reversion to the signaling mode will not occur until after service has been restored to normal; thus there is no risk that the SCR's of the cycloconverter will become overloaded as a result of successive attempts at reclosure.

The inverse voltage capabilities of SCR's 41 and 51 should be chosen to be adequate to accommodate the potentials encountered in the protective circuitry but should not be excessive in that this inverse breakdown provides the ultimate protection for the system.

SWITCHING OF CURRENT PATHS IN CYCLOCONVERTERS

In discussing the transitions from one current path to another in the operation of a cycloconverter it is convenient to define the earlier and the later path for any transition as being the path in which current flows before and after the transition, respectively.

Voltage waves of positive and of negative slope have been defined according as the potential increases or decreases in the algebraic sense with increasing time. One may now define a transition as being of increasing or of decreasing slope according as the slope of the voltage wave supplying the later path is greater or less than the slope of the voltage curve supplying the earlier path.

In idealized transitions in a cycloconverter one would wish to effect transitions from one current path to another at times when the amplitudes of the voltage sources that supply the two paths are equal—such a concept implies a transition effected instantaneously. Physically realizable transitions are achieved over periods of finite duration.

Since the idealized transition would involve a transition from a path supplied by a voltage curve of one slope to a path supplied by a voltage curve of a different slope at a time when the amplitudes of the voltages are equal it is clear that the voltages of the driving sources cannot remain equal throughout any actually achievable transition.

During the gradual transition from one path to another a state must exist in which current is flowing on both the earlier and the later path. In the naturally commutating transition, which is the subject of the present invention, the attempted transition should be triggered at a time when the potential relationships are favorable to the desired transition; further these favorable potential conditions should persist throughout the transitional period and beyond, until the carriers have disappeared in the SCR that has ceased to conduct.

The conditions for realization of a successful transition can be summarized as follows. If the current persists in the positive sense throughout the transitional period then it will be possible to effect the transition only provided the transitional period lies entirely before or subsequent to the time at which the amplitudes of the input voltages for the two paths become equal, according as the attempted transition is one of decreasing or of increasing slope; similarly when the current remains negative throughout the transitional period this transitional period must lie entirely before or after the time at which the input voltages for the two paths become equal, according as the attempted transition is one of increasing or of decreasing slope. A transition attempted under any other condition will not succeed. In particular it should be noted that if the transitional state is established under conditions that are favorable to the transition and the potential conditions subsequently become unfavorable to the transition before the final or later state has been attained and the carriers have disappeared in the SCR of the earlier path then the earlier state will be resumed.

The duration of the transitional state is obviously a matter of concern. This is determined by the magnitude of the current that must be rerouted and by the inductance of the circuits along which the switching must be achieved. In general the duration of the transitional period is proportional to the product of the current flowing in the circuit and the leakage inductance of the transformer that serves as the voltage source. (This latter inductance tends to dominate over all other inductances in most practical instances.)

The carrier population in an SCR will disappear once current ceases to flow though it, provided that no triggering signal is maintained at the gate. One may use the term "clean-up time" to designate the period within which the carrier population will decline to such a level that untriggered conduction will not result if potential relationships favorable to conduction were reestablished.

Inverter grade SCR's are specifically designed to reduce this clean-up time; these are normally preferred for use in cycloconverters. The data on clean-up time customarily published by manufacturers pertains to the situation when the current is suddenly extinguished from its full rated level. Clean-up times from lesser levels of conduction are correspondingly briefer.

In the case of a cycloconverter working into an active load the current through an SCR may cease because the externally impressed flow vanishes; when this occurs the carrier population will be relatively small at the time conduction ceases and the clean-up time will be less than that indicated in the manufacturer's published information. This is the situation that prevails when the current zero-crossing coincides with the time of the idealized transition from one voltage source to another.

Fortunately this situation exists when the current vanishes at times when one would wish to effect a transition from one voltage source to another—otherwise the situation could arise in which the potential conditions favorable to a transition might not be realized prior to the time when the magnitudes of the voltage sources for the two paths become equal, then subsequent to these voltages becoming equal conditions for the transition would again be unfavorable because the sense of current flow had reversed.

CAPACITOR TO PROVIDE CURRENT CONTINUITY NEAR ZERO-CROSSING

The solution to this problem is extremely simple. One need only sense when the current through a conducting path becomes zero, and at that time fail to provide a path for current flow through the cycloconverter for a brief period. Note that capacitors 46 and 56 (or resistor 101 and capacitor 100) will provide for current continuity for a brief period. The following quantitative aspects of this situation should be examined.

The forward drop in an SCR and a diode in series must be 1.4 volts when the current vanishes. Conduction in the opposite direction through the cycloconverter cannot commence until the voltage has built up to 1.4 volts in the opposite sense; thus there must be a change of 2.8 volts from the time the current ceases until conduction is resumed. If the current in the neutral of the distribution feeder is assumed to be 100 amperes r.m.s. (which is unreasonably large) then immediately following the current zero-crossing the current will increase linearly at a rate of $337 \times 141.4 = 5.33 \times 10^4$ amperes per second. During a brief period of $t$ seconds after the zero-crossing the same charge transfer will amount to $2.66 \times 10^4 t^2$ coulombs. If the capacitance 56 or 46 of FIG. 2 were $10^{-6}$ farads the change of 2.8 volts will be realized in a period of $10.26 \times 10^{-6}$ seconds.

In the actual circuit used for protection against possible fault current the capacitors 56 and 46 were 32 microfarads each; this permits a pause of 56 microseconds between the time when current ceases and the time when conduction need be triggered in the opposite direction even if the neutral current were as high as 100 amperes.

Such a high value for the out-of-balance current is scarcely credible in the case of a feeder designed for less than 400 amperes phase current. Thus the delay that can be permitted, between the cessation of current in one direction and the necessary triggering of conduction in the opposite sense, can probably exceed this 56 microseconds.

In the same sense that the introduction of the capacitance in shunt with the normal active load of the cycloconverter can avoid the potentially awkward switching problem when the current zero-crossing coincides with the time when the amplitudes of the two voltage sources become equal, this same capacitance can eliminate the need for triggering an SCR immediately subsequent to a current zero-crossing. This permits a significant simplification in the triggering logic and is employed in the preferred embodiment of this invention — though alternative means of dealing with these problems will also be discussed.

FUNCTIONING OF A PREFERRED EMBODIMENT

Figure 1:
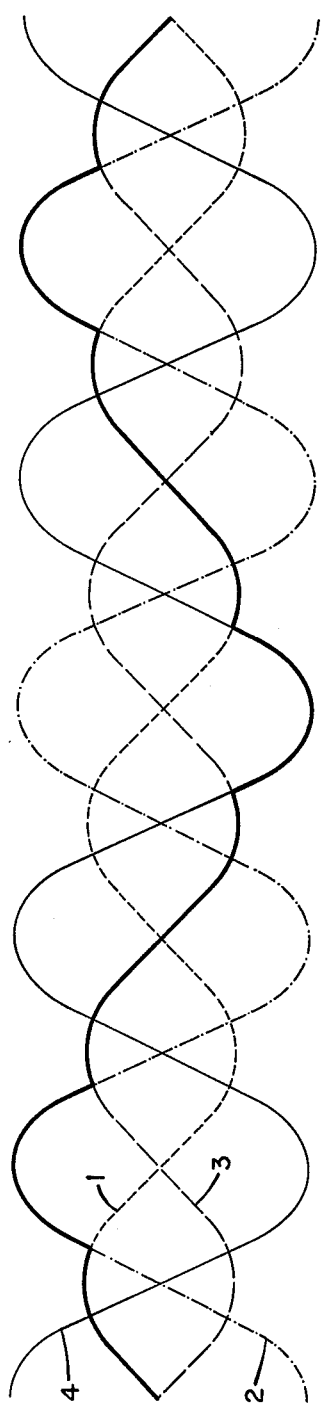
Figure 3:
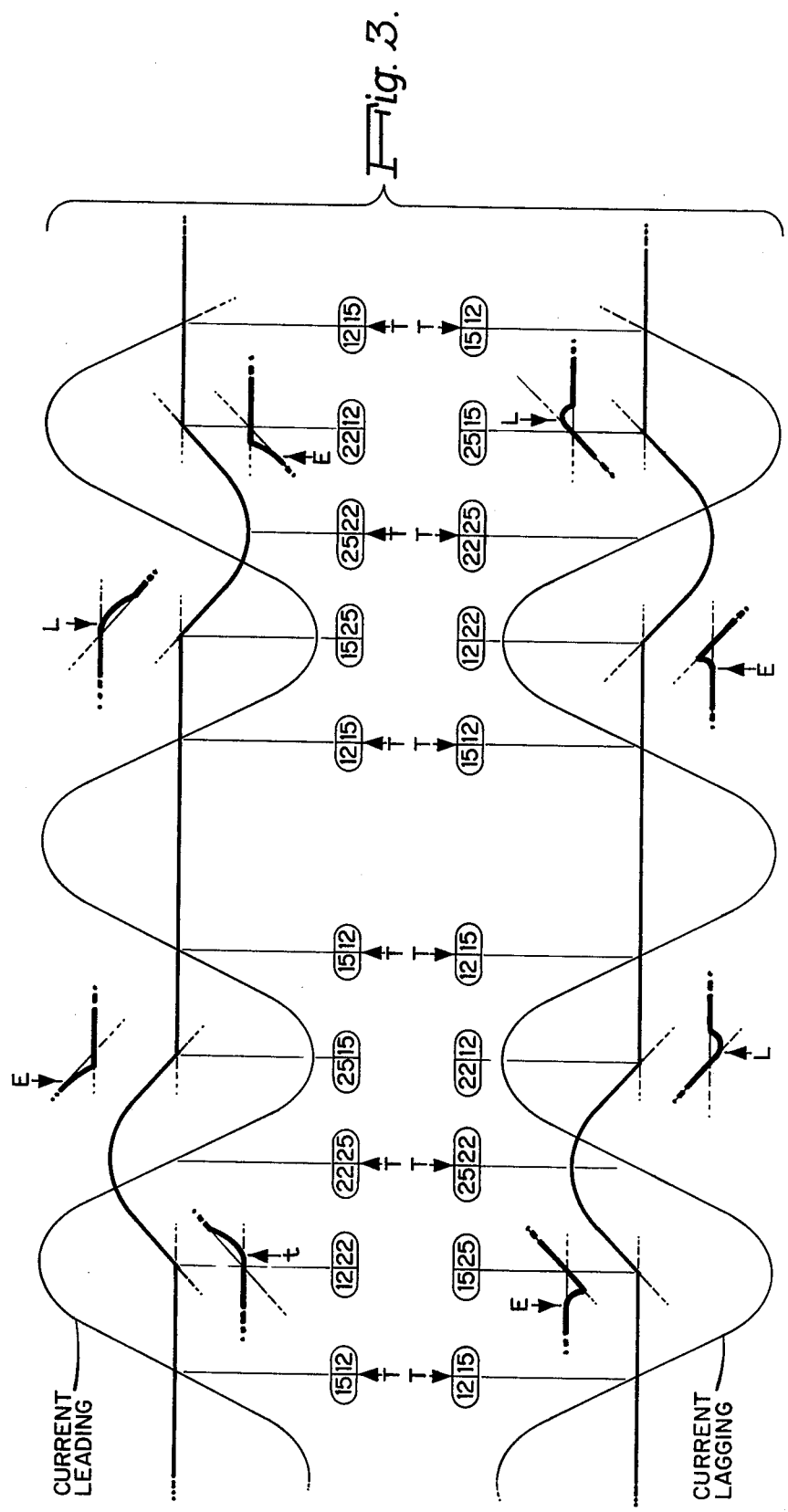
FIG. 3 depicts the voltage/current relationships that actually occur in the switching processes when allowance is made for the fact that the idealized transition is not realizable in practice and that an overlap angle of finite magnitude will exist in any achievable switching transition.

In considering the detailed functioning of the cycloconverter in its preferred embodiment, FIGS. 2 and 3 should be examined together. FIG. 3 depicts a type of waveform such as one might wish to impress between the grounded neutral and the common point of the wye-connected secondary of the substation transformer. In particular the transitions depicted are those which can occur at the beginning or end of a message when the signal from the modulating transformer is either being introduced or is being removed. In a practical embodiment the modulation transformer 8 will have finite leakage inductance which will modify the waveforms shown in FIG. 3.

The waveform of FIG. 3 is comprised of half-sinusoids of power line frequency introduced into a signal that is otherwise of zero voltage. Those skilled in the art will appreciate that there is no essential difference in the commutation that occurs at the transition between a half-sinusoid of voltage of positive polarity and the zero voltage signal and that between a half-sinusoid voltage of positive polarity and a half-sinusoid of voltage of negative polarity. Similarly the commutation between a half-sinusoid of voltage of negative polarity and the signal of zero amplitude resembles that between a half-sinusoid of voltage of negative polarity and one of positive polarity. Accordingly, there is no need to draw the figure that would represent the type of transitions that would occur when the current commutates between the upper and the lower arm of the cycloconverter.

In FIG. 3 the commutation details are shown for the case of both leading and lagging current. (These waveforms have been drawn for a case in which there is a modest inductance in the shunt path.) Both the current and voltage waves are plotted in FIG. 3. In displaying these two types of wave the convention has been adopted uniformly that current in the positive sense and voltage of positive polarity are shown above the axis.

The rules for successful commutation that have been described earlier may be summarized for the curves in FIG. 3 as stating that the transition from one segment to the next in the synthesis of the desired waveform can only be effected at times when the earlier segment of the voltage wave lies further from the current wave than does the later segment of the voltage wave. Thus in attempting to realize the desired waveform it is necessary that the gate of the SCR that is to provide the new current path be triggered at the proper time, and this proper time will be either earlier or later than the idealized transitional point in order that the potentials that exist may be favorable to the desired transition. The voltage waveforms that result thus depart marginally from the waveforms of the idealized transitions. The details of the voltage waveforms in the vicinity of the transitional points are indicated in inserts in FIG. 3. The time when the SCR must be triggered is indicated with an E or an L as the triggering must be earlier or later than the idealized transition.

The duration in seconds of this transitional period will be approximately equal to the product of the current that must be switched (in amperes) and the leakage inductance of the modulation transformer (in henries).

In FIG. 3 a divided oval appears at each point where the current path must be altered to effect the transition from one voltage source to another in the cycloconverter, and at each point where the current changes sense. The numbers appearing in the left and right halves of each oval indicate the SCR in FIG. 2 that must be carrying the current before and after the change in current routing. Notice that in the divided oval associated with the reversal of polarity of current flow it is the units digit of the SCR designation that changes; in the case of transitions from one segment to the next of the synthesized voltage curve it is the tens digit of the SCR designation that changes. (This stems of course from the convention adopted in numbering components in FIG. 2.)

In the case of rerouting of the current from one SCR to another as a consequence of reversal of sense of current flow it is inappropriate to designate the triggering as early or late, rather it is designated with a T signifying a time delay beside each of the divided ovals. The notation E, L, and T is consistent with that employed in FIG. 4 where the logic appropriate to the controlled firing of the SCR's to encode digital data is described.

Because the current may be large in the vicinity of a transition from one segment of the waveform to the next it is essential that the triggering prior to the idealized transitional point be done sufficiently early as to guarantee that the transition will have been accomplished and the carriers in the extinguished SCR will have disappeared before the potentials supplying the two transitional paths become unfavorable to the desired transition.

SIMPLIFICATION OF SWITCHING LOGIC

While the above discussion accurately portrays the conditions that must prevail in order that a desired transition may succeed it is appropriate that a most expeditious approach to simplifying the implementation of the switching logic should be described. The switching rules detailed below pertain to the environment depicted in FIG. 8, wherein the paths are designated A, B, C, etc. and the sense of current flow is designated + or −.

Subject to this convention the switching logic may be described as follows:

1. Select a time sufficiently in advance of the idealized transition that one may be assured that the desired transition will succeed in the event that the desired transition belongs to the class that must be triggered in advance of the idealized transition.
2. Remove all triggering at this time.
3. Select the path A or B or C or etc. which should next conduct — note that this may entail no change in path.
4. Prohibit triggering in the + (or −) sense for all paths if the current flow at the time triggering was interrupted was in the + (or −) sense.
5. After a fixed delay (e.g. 50 microseconds) trigger the flow in the sense that prevailed when triggering was removed in accordance with (2) for the path in which conduction is desired and maintain unless or until countermanded by (6).
6. If all currents disappear inhibit all triggering for a fixed delay (e.g. 50 microseconds) beyond the time of disappearance; thereafter trigger the SCR's for the current in the desired path for both current senses. (Note that if the current disappears during the period of no triggering following (2) the period of no triggering is continued until one realizes the fixed period beyond the time at which the currents disappeared.)
7. Maintain the prohibition on triggering initiated under (4) until the earlier of:
   (a) triggering in accordance with (6);
   (b) conduction is established in the desired path and in no other path.
8. Once the current is established in the desired path and in no other path, provide triggers for both + and − conduction sense in that path and maintain until (1).

The implementation of this switching logic will ensure the success of all transitions that must be achieved prior to the time when the voltages supplying the two paths that participate in the transition become equal. It will also ensure that transitions that cannot occur until after these two voltages have become equal will be completed at the earliest possible time.

In the above discussion it will be noted that capacitor 100 with its associated current limiting resistor 101 provides continuity of the externally driven current at any time when the cycloconverter is not conducting. Further it will be noted that if there is no inductance in the bypass path then so long as current flows in this bypass path the voltage drop through the cycloconverter will be 1.4 volts corresponding to the forward drop in the SCR and diode. In the conducting arm this 1.4 volts will be comprised of the transformer voltage and the drop across the leakage inductance.

When current ceases to flow in the bypass path the voltage across the cycloconverter will change abruptly; the voltage across the leakage inductance will be free to collapse producing a damped oscillation within the circuit composed from the series combination of the leakage inductance of the conducting arm, the bypass capacitance and the current limiting resistance. When this occurs ringing may be in evidence at the output of the cycloconverter.

Similarly when the current reverses there is a brief period in which no current flows through the cycloconverter, during which time the current flows in the bypass capacitor with the result that a voltage builds up across this capacitor. When conduction is resumed a damped oscillation can again occur in the series circuit comprised of the leakage inductance of the conducting arm, the bypass capacitor and the current limiting resistor. When this occurs one will observe ringing on the output voltage of the cycloconverter; the initial amplitude of this oscillation will be proportional to the slope of the current wave when it passes through zero.

It may be desirable to eliminate these instances of ringing on the output voltage of the cycloconverter; this may be accomplished by arranging that the Q of the series circuit is less than two. This condition will be approximately satisfied if $$(L/C)^{\frac{1}{2}}/R < 2$$

where R is the current limiting resistance 101 in ohms, C is the bypass capacitance 100 in farads and L is the leakage inductance in henries on the secondary side of the modulation transformer. This leakage inductance on the secondary side may be obtained from the percent reactance of the transformer through the relationship.

$$L(\text{henries}) = \frac{10}{2\pi f} \text{ (percent reactance) } \frac{(\text{secondary output voltage in } kV)^2}{(\text{power rating in } kVA)}$$

NEED TO SENSE CURRENT THROUGH INDIVIDUAL SCR'S

One of the features that distinguishes the present invention from cycloconverters of the prior art is the fact that the current that flows through the cycloconverter is not determined by the voltages supplied to the cycloconverter and the impedance into which it works. In this case the current is impressed by an external source and it is essential that the current flowing through the individual SCR's be sensed in order that correct switching may be accomplished.

In FIG. 2 it will be noted that a diode is in series with each SCR of the cycloconverter. A voltage drop of at least 0.7 volts will occur across this diode so long as current flows through that path. This voltage will persist so long as forward current exists even though the magnitude of this forward current may become very small. When the forward current ceases to flow this voltage across the series diode will fall sharply to zero. Accordingly, the presence or absence of this voltage drop across the diode (or across a resistance, not shown, in parallel with the diode) can serve as a sensitive indicator of whether current is flowing or not in the series SCR.

One might be tempted to measure the forward voltage drop across the SCR per se as a means of sensing the flow of current. This is, however, not satisfactory for the illustrated application of this invention in that a voltage drop will be observed so long as gate current flows in the SCR. Accordingly, if the SCR were triggered "on" yet current was not flowing, one might believe that the current had not ceased to flow. It was from this consideration that the decision was made to install a series diode to serve as a current monitor.

It will be observed that the measurement of the voltage drops across the diodes that are in series with the SCR's of the cycloconverter in FIG. 2 requires the use of isolated power supplies. However, some economy in the requirements for power supplies can be realized from the recognition that the supply that serves the sensor for detecting current flow in one direction can also serve the gate of the SCR that carries current in the opposite sense in the same arm of the cycloconverter. Thus a power supply floating at the potential of the end 20 of the secondary winding of the modulation transformer 8 can serve to sense current flow through SCR 22 by measuring the drop across diode 21 and also serve to trigger the gate 26 of SCR 25.

Manufacturer's specifications do not normally specify the current level at which an SCR can be considered to have ceased to conduct. In the case of the inverter grade SCR's used in the initial embodiment of this invention, the continuous duty rating was for several hundreds of amperes and it was established that the extinction level for these devices in the absence of gate drive was about 10 miliamperes. The technique of sensing the current flow by measuring the voltage drop across a series diode proved to be about an order of magnitude more sensitive than was needed.

LOGIC FOR CONTROL OF THE CYCLOCONVERTER

While the sensing of the conduction through the various SCR's and the triggering of the gates of the various SCR's of the cycloconverter is accomplished at a number of isolated potential levels it is desirable that the logical decisions be effected at a common potential. To this end all the results of current sensing are carried to a ground reference by means of optical isolators and the triggering signals are first generated at ground reference and then are transferred to the potential reference at which they are used by means of optical isolators.

The optical isolators used for this purpose are well known to those skilled in the art. Such isolators consist essentially of a light emitting diode which is controlled by the signal at the level where it is generated and of a phototransistor which operates at the potential reference to which the signal is to be transferred. These are available commercially in a single package with additional buffering circuitry included in the same package. Some care must be exercised in the selection of these devices to insure that the response times and sensitivities are satisfactory in the case of low level signals.

In the preferred embodiment a single-phase input voltage serves the cycloconverter and the transitions among the three possible current paths are effected in the vicinity of the zero-crossing of this input voltage wave. Those skilled in the art will appreciate that digital information can be encoded in such a scheme in a wide variety of ways — one might in principle even use this equipment to represent digital information in ternary form since there are three optional current paths.

The encoding scheme that is perhaps simplest in concept entails switching between the upper and lower arms of the cycloconverter in a predetermined manner to impress a pure phase modulation on the A-phase voltage. Encoding can then be implemented by advancing the phase for a "one" and retarding it for a "zero". Obviously more complicated switching patterns can be achieved if desired.

FIG. 4 depicts in block diagram form the essential elements of the logic control circuitry which permits digital data to be represented as advanced or retarded waves on A-phase. The choice of a more complicated encoding technique in one practical implementation arose from the combined considerations of simplicity of the receiver and of the desire to make the signaling equally effective on all three phases. However, since the more elaborate encoding technique introduces nothing new by way of teaching relative to this invention one need only consider the simplest technique to illustrate the essential features.

For purposes of discussion, it is convenient to divide FIG. 4 into two portions: on the left hand side various logical quantities required as inputs to the decision making circuitry are generated; on the right hand side the decision making circuitry per se is depicted. The optical isolation that transfers the data from one potential reference to another is merely shown as an unnumbered box.

In the upper left of FIG. 4 the logical quantities $I_{21}$, $I_{31}$, $I_{24}$, and $I_{34}$ are generated. This is accomplished by sensing the current in the diodes (21), (31), (24) and (34), respectively, by measuring the potential across the diode (or across a parallel resistance) and transmitting to logic potential the information as to whether current flows or not via optical isolators. Thus $I_{21}$, $I_{31}$, $I_{24}$, and $I_{34}$ are logic levels.

A polarity latch 100 displays the sense in which current last flowed. If the current is flowing in the positive sense the latch will be set to state P. When the current ceases to flow the latch remains set in its most recent state and this state will not be reversed until current begins to flow through an SCR in the opposite sense. The purpose of this latch is to preserve a sense of how the current last flowed. When the current ceases to flow one need not trigger an SCR during the time the bypass capacitors 46 and 56 (FIG. 2) are providing current continuity, yet the sense in which the SCR must next be triggered will be preserved by the state of the polarity latch.

The logic depicted in FIG. 4 will effect transitions from one arm to the other in the vicinity of the negative sloped zero-crossing of the input voltage to the cycloconverter. To this end a positive slope zero-crossing detector 102 is provided to serve as a trigger for three delay counters 104, 106 and 108. The "Early" delay 104 effects a delay of less than 1/120 second so that the early transitions may be triggered at time E somewhat prior to the negative sloped zero-crossing which will follow. The "Late" delay 106 effects a delay of somewhat more than 1/120 second so that late transitions may be triggered somewhat beyond the negative sloped zero-crossing that follows. The choices of these delays are determined by the desire to effect a transition reasonably close to the idealized transition yet, in the case of the early transition, one must insure that the triggering precedes the zero-crossing by sufficient time to guarantee that the transition will have been effected and the carriers in the SCR that ceases to conduct will have disappeared before unfavorable potential conditions are established.

A shift delay 108 is also generated from the output of the positive slope zero-crossing detector; the delay in this case insures that the transition effected in response to a late trigger will have been realized before data is shifted in data register 110 in preparation for the next bit that is to be encoded.

A NOR gate 112 with inputs $I_{21}$, $I_{31}$, $I_{24}$ and $I_{34}$ will produce a positive pulse when current ceases to flow in the cycloconverter. This effects a delay of about 50 microseconds (indicated functionally by block 114) before permitting any SCR to be triggered; during this time current continuity in the neutral of the distribution feeder is maintained by the bypass capacitors (46) and (56).

The remaining portion of the logic is involved in the triggering of the appropriate SCR's; this is shown on the right side of FIG. 4. Whether the upper or lower arm is to conduct is determined by the output of the data register 110. The decision as to whether the transition is to be from the upper to the lower arm or vice versa determines the slope of the transition; whether the triggering should be effected early or late is determined by the slope of the transition and by the sense of the current.

The logic actually depicted will trigger the appropriate SCR at the proper time to effect the transition to accomplish the transition needed to encode the data and to deal with current reversals; it is a matter of no particular significance that a triggering pulse will also be applied to the SCR that is currently conducting in instances in which no change of status is to be effected.

The logic depicted will also provide a triggering pulse to the appropriate SCR after the delay of approximately 50 microseconds following the reversal of direction of the neutral current.

Those skilled in the art will recognize that the illustrative circuit of FIG. 4 contains only those essentials that contribute to the understanding of this invention. Such features as the inhibiting circuitry which discontinues all triggering of SCR's of the cycloconverter in the event of a line fault are not shown in FIG. 4 — such aspects are essential to the practical implementation of this system but are so conventional as not to require illustration.

PRESERVING CURRENT CONTINUITY WITHOUT BYPASS CAPACITOR

One may implement logic which will preserve the continuity of the current through the cycloconverter without requiring the use of a bypass capacitor to deal with the brief period near the time when the current reverses. Problems arise when the current zero-crossing and the voltage zero-crossing approximately coincide. The logical decisions that are required are, however, of considerably greater complexity, and this procedure is not recommended.

There arises one situation in which the current zero-crossing and the voltage zero-crossing exactly coincide and are in the opposite sense in which case it is impossible to effect reliable transitions. In other situations it may be difficult to effect the desired transition on every occasion but the state reached will be predictable.

Essentially all that is involved is to be certain that any short circuit that is imposed on the modulation transformer occurs in such a fashion that the shortcircuit cannot persist for longer than a few degrees during which the driving voltage is declining. The problem arises when one must create a path for current of the opposite sense at a time when the voltage transition has not been completed; the solution is to trigger an SCR in one of the two conducting arms which will carry current in the opposite sense. The correct arm to select is that for which the voltage wave of the source is in a sense such that the driving voltage for the short circuit is declining.

In the case of a cycloconverter which injects current into the neutral of a distribution feeder it would be very difficult to deal with current reversals near the voltage zero-crossing by any technique which avoided the bypass capacitor, since one would be compelled to provide either an alternate input voltage to the cycloconverter or to provide a local capacitance on one of the phases which could be used to remove situations in which modulation became highly unpredictable.

OTHER APPLICATIONS

While this invention has been described in connection with a specific application one may readily envisage its use in other situations. In the specific embodiment described in detail herein the cycloconverter is used to add the same signal to each of the three phase voltages on the distribution feeder. Those skilled in the art will recognize that three cycloconverters can be used to impress separate signals on individual phases of a power system. Similarly such a cycloconverter can be used to superimpose a signal on a single phase system. The single phase system is illustrated in FIG. 2A with the same reference numerals indicating like components in FIG. 2. The secondary 2 of a single phase power transformer supplies load $L_A$ indicated as 5. The exitation voltage on the primary side of the modulation transformer 8 corresponds to the voltage between ground 10 and the secondary of the power transformer with a ninety degree phase shift obtained from phase shifter 116.

It is also possible to use the cycloconverter as a means for accomplishing an electronically controlled phase shifting transformer. Such a device could conceivably find application in the balancing of loads of a multiplicity of generators driven from a common shaft.

Applications may arise in which the cycloconverter may supply a significant share of the total power into a load and yet an external source provides such a fraction that the current flow through the cycloconverter cannot be predicted from the cycloconverter waveform and the impedance of the load.

Having described in detail the preferred embodiment of the invention, it will now be apparent to those skilled in the art that various modifications and adaptations can be made without departing from the scope and teaching of the invention as defined in the appended claims.

What we claim and desire to secure by Letters Patent of the United States is:

1. A naturally commutated cycloconverter for use with an external, alternating current power source that supplies power to at least one active impedance, said cycloconverter comprising:
   (a) a plurality of selectively controlled, unidirectional current path means arranged in pairs with each pair of unidirectional current path means providing for bidirectional current flow, said pairs being connected in parallel with each other and connected with the external, alternating current power source and said at least one active impedance so that the magnitude and phase of the current supplied to said at least one active impedance from said external, alternating current path source through the plurality of unidirectional current path means are determined by the voltage of the external, alternating current path source and by the said at least one active impedance that is supplied power by said external, alternating current power source;
   (b) means for supplying an input wave for each of said pairs of a plurality of selectively controlled, unidirectional current path means; and
   (c) means for selectively controlling the conduction states of the unidirectional current path means in each pair.

2. The cycloconverter of claim 1 wherein said plurality of said selectively controlled, unidirectional current path means are connected in series with the external, alternating current power source and the said at least one active impedance.

3. The cycloconverter of claim 1 wherein said input wave is a voltage wave.

4. The cycloconverter of claim 3 wherein said voltage wave is derived from the voltage supplied to said at least one active impedance.

5. A naturally commutated cycloconverter for use with an external, alternating current power source that supplies power to at least one active impedance, said cycloconverter comprising:
   (a) a plurality of pairs of phase-controlled rectifiers connected in inverse-parallel, said plurallity of pairs of phase-controlled rectifiers being connected in parallel with each other and connected with the external, alternating current power source and said at least one active impedance so that the magnitude and phase of the current supplied to said at least one active impedance from said external, alternating current power source through the plurality of rectifiers pairs are determined by the voltage of the external, alternating current power source and by the said at least one active impedance that is supplied power by said external, alternating current power source;
   (b) means for supplying an input wave for each of said plurality of pairs of phasecontrolled rectifiers; and
   (c) means for selectively controlling the conduction states of the phase-controlled rectifiers in each pair.

6. An apparatus for synthesizing a voltage waveform that is superimposed upon the voltages of the three phases of an electric power distribution feeder that is supplied power by a wye-connected secondary of a substation transformer, said apparatus comprising:
   (a) cycloconverter means having a plurality of parallel, selectively controlled, unidirectional current paths connected in series with the common point of the wye-connected secondary of the substation transformer and the grounded neutral that serves all phases of the electric power distribution feeder;
   (b) means for supplying an input wave for each of said plurality of parallel, selectively controlled, unidirectional current paths; and
   (c) means for selectively controlling the conduction state of said plurality of parallel, selectively controlled, unidirectional current paths.

7. The apparatus of claim 6 wherein said input wave is a voltage wave.

8. The apparatus of claim 7 wherein said voltage wave is derived from the source that supplies voltage to the substation transformer.

9. The apparatus of claim 6 further comprising:
   (a) means responsive to the total current flow through the unidirectional current paths for generating a fault signal when said total current flow reaches a predetermined value; and
   (b) means responsive to said fault signal for establishing a fault current path between the grounded neutral and the common point of the wye-connected secondary of the substation transformer.

10. The cycloconverter of claim 6 further comprising:
    (a) means responsive to a predetermined voltage level between the common point of the wye-connected secondary of the substation transformer and the grounded neutral for producing a fault signal; and
    (b) means responsive to said fault signal for establishing a bidirectional current path between said common point and said grounded neutral.

11. The cycloconverter of claim 6 wherein said means for selectively controlling the conduction states of said plurality of parallel, selectively controlled, unidirectional current paths includes means for sensing the flow and the cessation of flow of current through each of the said plurality of parallel, selectively controlled, unidirection current paths.

12. An apparatus for synthesizing a voltage waveform which is superimposed upon the voltages of the phases of an electric power distribution feeder that is supplied power by a wye-connected secondary of a substation transformer, said appartatus comprising:

(a) cycloconverter means having:
  (i) a first pair of phase-controlled rectifiers connected in inverse-parallel;
  (ii) a second pair of phase-controlled rectifiers connected in inverse-parallel; and
  (iii) a third pair of phase-controlled rectifiers connected in inverse-parallel, said first, second and third pairs of phase-controlled rectifiers being connected to provide three current paths between the common point of the wye-connected secondary of the substation transformer and the grounded neutral that serves all phases of the electric power distribution feeder;

(b) a center-tapped modulation transformer for supplying an input voltage wave for each of said pairs of phase-controlled rectifiers, said substation transformer being excited by a voltage, the phase of which is that of a voltage which exists between two phases of the wye-connected secondary of the substation transformer; and, (c) means for selectively controlling the conduction states of the phase-controlled rectifiers in each pair.

13. A method for synthesizing a voltage waveform using a cycloconverter comprising the steps of:

(a) electrically interconnecting a cycloconverter having a plurality of selectively controlled, unidirectional current paths therein with an external, alternating current power source and at least one active impedance so that the magnitude and phase of the current supplied to said at least one active impedance from said external, alternating current power source through the said cycloconverter are determined by the voltage of the external, alternating current power source and by the said at least one active impedance that is supplied power by the external, alternating current power source;

(b) supplying an input wave to the said cycloconverter; and, (c) selectively controlling the conduction states of the plurality of selectively controlled, unidirectional current paths in the said cycloconverter.

14. The method of claim 13 wherein the step of supplying an input wave to said cycloconverter comprises supplying an input voltage wave to said cycloconverter.

15. The method of claim 14 wherein the step of supplying said input voltage wave to said cycloconverter further comprises the step of deriving said input voltage wave from the voltage supplied to said at least one active impedance.

16. The method of claim 13 further comprising the step of arranging said plurality of selectively controlled, unidirectional current paths in at least first and second pairs with each pair providing for bidirectional current flow, wherein the unidirectional current paths conduct when triggered and remain conducting until the cessation of current flow, and wherein the conduction state of each pair of the unidirectional current paths is selectively controlled in accordance with the following steps:

(a) selecting a time sufficiently in advance of the idealized transition to insure that the desired transition will succeed in the event that the desired transition belongs to the class that must be triggered in advance of the idealized transition;

(b) removing all triggering at this selected time;

(c) selecting the first or second pair paths which should next conduct;

(d) prohibiting triggering in the + (or −) sense for all pair paths if the current flow at the time triggering was interrupted was in the + (or −) sense;

(e) after a predetermined delay triggering current flow in the sense that prevailed when triggering was removed in accordance with step (b) for the pair path in which conduction is desired and maintaining said triggering unless or until countermanded by the following step (f);

(f) inhibiting, if all currents disappear, all triggering for a predetermined delay beyond the time of disappearance; thereafter, triggering the desired pair path for both current senses, if the current disappears during the period of no triggering following step (b), and continuing the period of no triggering until a predetermined period beyond the time at which the current disappeared;

(g) maintaining the prohibition on triggering initiated under step (d) until the earlier of:
  (1) triggering in accordance with step (f);
  (2) conduction is established in the desired pair path and in no other path; and, (h) once the current is established in the desired pair path and in no other path, providing triggers for both + and − conduction sense in that pair path and maintaining until step (a).

17. An apparatus for synthesizing a voltage waveform that is superimposed upon the voltage of a single phase electric power distribution system having an alternating current power source that supplies power to at least one active impedance, said apparatus comprising:

(a) cycloconverter means having a plurality of parallel, selectively controlled, unidirectional current paths connected in series with the alternating current power source and said at least one active impedance so that the magnitude and phase of the current applied to said at least one active impedance from said alternating current power source through the said plurality of parallel, selectively controlled, unidirectional current paths are determined by the voltage of the alternating current power source and by the said at least one active impedance that is supplied power by said alternating current power source;

(b) means for supplying an input wave for each of the said plurality of parallel, selectively controlled, unidirectional current paths; and, (c) means for selectively controlling the conduction states of the said plurality of parallel, selectively controlled, unidirectional current paths.

18. An apparatus for synthesizing a voltage waveform that is superimposed upon the voltage on at least one phase of a polyphase electric power distribution system having an alternating current power source that supplies power to at least one active impedance, said apparatus comprising:

(a) a cycloconverter means having a plurality of parallel, selectively controlled, unidirectional current paths electrically interconnected with the alternating current power source and the said at least one active impedance so that the magnitude and phase of the current supplied to said at least one active impedance from said alternating current power source through the said plurality of parallel, selectively controlled unidirectional current paths are determined by the voltage of the alternating current power source and by the said at least one active impedance that is supplied power by said alternating current source;

(b) means for supplying an input wave for each of the said plurality of parallel, selectively controlled, unidirectional current paths; and, (c) means for selectively controlling the conduction states of the said plurality of parallel, selectively controlled, unidirectional current paths.

19. A naturally commutated cycloconverter for use with an external, alternating current power source that supplies power to at least one active impedance, said cycloconverter comprising:

(a) a plurality of selectively controlled, unidirectional current path means arranged in pairs with each pair of unidirectional current path means providing for bidirectional current flow, said pairs being connected in parallel with each other and connected with the external, alternating current power source and said at least one active impedance so that the magnitude and phase of the current supplied to said at least one active impedance from said external, alternating current power source through the plurality of unidirectional current path means are determined by the voltage of the external, alternating current power source and by the said at least one active impedance that is supplied power by said external, alternating current power source;

(b) means for supplying an input wave for each of said pairs of a plurality of selectively controlled, unidirectional current path means;

(c) means for selectively controlling the conduction states of the unidirectional current path means in each pair;

(d) means responsive to the total current flow through the said plurality of selectively controlled, unidirectional current path means for producing a signal when said total current flow reaches a predetermined value; and (e) means responsive to said signal for establishing a bidirectional current path in parallel with said plurality of selectively controlled, unidirectional current path means.

20. A naturally commutated cycloconverter for use with an external, alternating current power source that supplies power to at least one active impedance, said cycloconverter comprising:

(a) a plurality of selectively controlled, unidirectional current path means arranged in pairs with each pair of unidirectional current path means providing for bidirectional current flow, said pairs being connected in parallel with each other and connected with the external, alternating current power source and said at least one active impedance so that the magnitude and phase of the current supplied to said at least one active impedance from said external, alternating current power source through the plurality of unidirectional current path means are determined by the voltage of the external, alternating current power source and by the said at least one active impedance that is supplied power by said external, alternating current power source;

(b) means for supplying an input wave for each of said pairs of a plurality of selectively controlled, unidirectional current path means; and, (c) means for selectively controlling the conduction states of the unidirectional current path means in each pair, wherein the controlling means comprises means for sensing the flow and the cessation of flow of said current through each of the plurality of unidirectional current path means.

21. A naturally commutated cycloconverter for use with an external, alternating current power source that supplies power to at least one active impedance, said cycloconverter used for synthesizing an output voltage waveform and comprising:

(a) a plurality of selectively controlled, unidirectional current path means arranged in pairs with each pair of unidirectional current path means providing for bidirectional current flow, said pairs being connected in parallel with each other and connected with the external, alternating current path source and said at least one active impedance so that the magnitude and phase of the current supplied to said at least one active impedance from said external, alternating current power source through the plurality of unidirectional current path means are determined by the voltage of the external, alternating curent power source and by the said at least one active impedance that is supplied power by said external, alternating current power source;

(b) means for supplying an input wave for each of said pairs of a plurality of selectively controlled, unidirectional current path means;

(c) means for selectively controlling the conduction states of the unidirectional current path means in each pair; and, (d) means for maintaining the continuity of the current flow to the said at least one active impedance (i) when the sense of the current flow reverses at any time within a segment of the synthesized output voltage waveform of the said cycloconverter and (ii) at the transition between successive signals of the said synthesized output voltage waveform.

22. The cycloconverter of claim 19 wherein said plurality of selectively controlled, unidirectional current path means are connected in series with the external, alternating current power source and the said at least one active impedance.

23. The cycloconverter of claim 19 wherein said input wave is a voltage wave derived from the voltage supplied to said at least one active impedance.

24. The cycloconverter of claim 20 wherein said plurality of selectively controlled, unidirectional current path means are connected in series with the external, alternating current power source and the said at least one active impedance.

25. The cycloconverter of claim 20 wherein said input wave is a voltage wave derived from the voltage supplied to said at least one active impedance.

26. The cycloconverter of claim 21 wherein said plurality of selectively controlled, unidirectional current path means are connected in series with the external, alternating current power source and the said at least one active impedance.

27. The cycloconverter of claim 21 wherein said input wave is a voltage wave derived from the voltage supplied to said at least one active impedance.

* * * * *